United States Patent [19]

Ishikawa

[11] Patent Number: 5,124,829
[45] Date of Patent: Jun. 23, 1992

[54] LIGHT BEAM SCANNING APPARATUS

[75] Inventor: Hiromi Ishikawa, Kanagawa, Japan

[73] Assignee: Fuji Photo Film Co., Ltd., Kanagawa, Japan

[21] Appl. No.: 599,913

[22] Filed: Oct. 19, 1990

[30] Foreign Application Priority Data

Oct. 20, 1989 [JP] Japan ................. 1-273099

[51] Int. Cl.$^5$ ............................................. G02B 26/10
[52] U.S. Cl. ..................................... 359/204; 359/217;
359/209; 250/236; 250/578.1; 346/108;
358/296
[58] Field of Search ............... 359/209, 210, 211, 216,
359/217, 196, 220, 204, 885, 889, 888;
250/578.1, 235, 236, 484.1, 337; 358/492, 496,
296; 346/157, 160, 108

[56] References Cited

U.S. PATENT DOCUMENTS

| | | | |
|---|---|---|---|
| 3,869,193 | 3/1975 | Schmit | 359/209 |
| 4,070,089 | 1/1978 | Grafton | 250/236 |
| 4,205,350 | 5/1980 | Gunning | 359/217 |
| 4,276,473 | 6/1981 | Kato et al. | 250/337 |
| 4,960,313 | 10/1990 | Yamanaka | 359/211 |

Primary Examiner—Loha Ben
Attorney, Agent, or Firm—Sughrue, Mion, Zinn, Macpeak & Seas

[57] ABSTRACT

The improved light beam scanning apparatus uses a simple and inexpensive focal point adjusting device to adjust the optical path lengths of a plurality of light beams having different wavelengths so that their focal lengths will coincide with each other. This permits not only a number of optical members in the main scanning optics to be used in common for the plurality of scanning beams but also the sub-scanning transport mechanism to be used in common for more than one kind of object to be scanned. Accordingly, the light beam scanning apparatus is compact and inexpensive and yet is capable of scanning to read image information from plural kinds of objects or to record image information on plural kinds of objects or to read and record such information from more than one object to be scanned.

7 Claims, 5 Drawing Sheets

F I G. 2
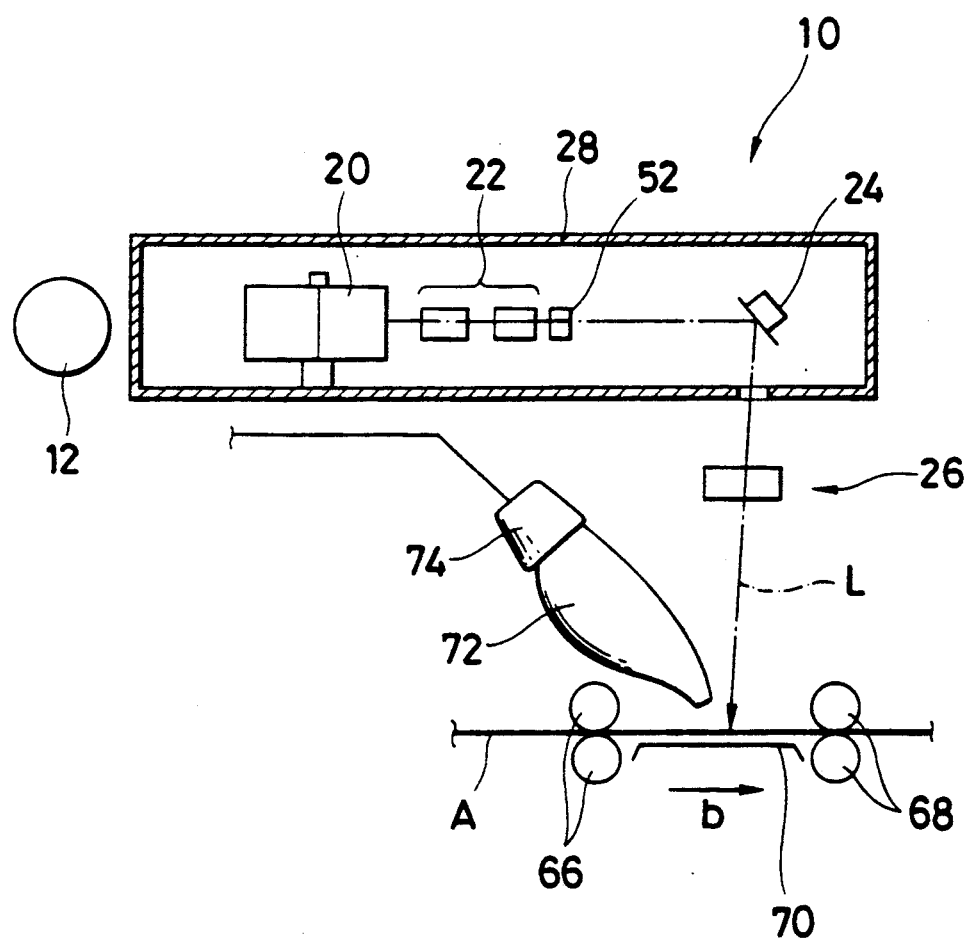

LIGHT BEAM SCANNING APPARATUS

BACKGROUND OF THE INVENTION

1. Field of the Invention

This invention relates to a light beam scanning apparatus having a plurality of light sources that emit light beams of different wavelengths as to image reading and recording.

2. Description of the Prior Art

One of typical prior art methods for obtaining radiation images as picture images is a radiographic system using a radiographic film having an emulsion layer comprising a silver halide photosensitive material in combination with a sensitizing paper As a substitute for this radiographic system, attention is recently drawn to a radiation image recording and reproducing system using a stimulable phosphor.

Certain phosphors, when exposed to radiation such as X-rays, $\alpha$-rays, $\beta$-rays, $\gamma$-rays, electron beams and ultraviolet rays, store part of the energy the radiation possesses When the phosphor is subsequently exposed to excitation light such as visible light, it produces stimulated emission corresponding to the stored energy. The phosphor exhibiting such properties is known as a stimulable phosphor There is proposed a system for recording and reproducing radiation image information using the stimulable phosphor. In such a system, the radiation image information of an object such as a human body is first stored in a sheet having a layer of stimulable phosphor (referred to as "stimulable phosphor sheet" or simply "phosphor sheet", hereinafter). The sheet is then scanned with excitation light which causes it to produce stimulated emission in proportion to the radiation energy stored. The emitted light is detected with an optical device to obtain image signals as electrical signals. The image signals are processed to provide a radiation image of the object ready for diagnosis. Reference is made to U.S. Pat. Nos. 4,258,264, 4,276,473, 4,315,318 and 4,387,428 and Japanese Patent Application Kokai No. 56-11395.

Compared with a prior art radiographic system which uses a radiation-sensitive film and a sensitizing paper, the system described above has the practical advantage of the ability to record image over an extremely broad range of radiation exposure. This system comprises a recording unit which stores and records radiation image information on a stimulable phosphor sheet, a reading unit which reads the radiation image information stored and recorded on the stimulable phosphor sheet and which outputs an image signal, and an image reproducing unit which scans a recording sheet with a light beam modulated in accordance with the image signal obtained with the reading unit and which renders the image information visible.

There is a growing need in the industry today for reducing the cost of manufacturing the above described radiation image information recording and reproducing system by minimizing its overall size and various improvements have been made in response to this need. In fact, however, it is difficult to reduce the overall size of the conventional system which, as mentioned above, requires a recording unit, a reading unit and a reproducing unit to be installed separately from one another. Further, the need for providing a light beam scanning means for both the reading unit and the reproducing unit has limited the efforts to reduce the cost of manufacturing the system.

Under these circumstances, the assignee proposed in Japanese Patent Application Kokai No. 64-533 a radiation image information reading and recording/reproducing system that allows both the reading and reproduction (recording) of image information to be performed by the same scanning means within the same system and which preferably permits the greater part of the scanning means to be used in common for both a reading and recording light beam so that the system can be rendered compact and manufactured at a lower cost. In this system, the reading unit and the reproducing unit are made into a compact unitary assembly so that the overall system of recording and reproducing radiation image information can be made compact and manufactured at a lower cost.

In certain cases of operation of a radiation image information reading and reproducing system of the type described above which has an image information reading unit and recording (reproducing) unit made into a unitary assembly, a reading light beam for exciting the radiation information stored on a stimulable phosphor sheet and a recording light beam for recording an image on a recording sheet in accordance with the image information readout have different wavelengths depending upon such factors as the type of the recording sheet or stimulable phosphor sheet used. In such cases, a plurality of light beams having different wavelengths need to be emitted from a reading light source and a recording light source and it is preferred that the greater part of the light beam scanning means including various optical devices is used in common for both the reading and recording light beams. However, if various optical devices are used in common for a plurality of light beams having different wavelengths, the problem of mismatch occurs with respect to the focusing positions of the respective light beams (the positions of their focal points). In other words, if the same optical devices are used with two light beams having different wavelengths, the difference in refractive index due to the wavelength difference causes a difference between the positions of the focal points of the two light beams and this introduces difficulty in using the same transport means in common for the objects to be scanned with the respective light beams which may be exemplified by a stimulable phosphor sheet and a recording sheet. If necessary, the positions of the focal points of the respective light beams could be brought into registry by compensating for the chromatic aberration that will develop in the lenses provided in the light beam scanning means but this approach is very costly.

BRIEF SUMMARY OF THE INVENTION

The present invention has been accomplished in order to solve the aforementioned problems of the prior art light beam scanning apparatus having a plurality of light sources that emit light beams of different wavelengths as for image reading and image recording.

Therefore, the present invention has as its principal object providing a light beam scanning apparatus that permits the greater part of a light beam scanning means to be used in common for light beams having different wavelengths, that enables efficient compensation for the mismatch in the positions of the focal points of the light beams due to the difference between their wavelengths, and that yet is simple enough in construction to be manufactured at low cost.

This object of the present invention can be achieved by a light beam scanning apparatus which deflects light beams in a direction of main scanning and which scans twodimensionally an object of interest moving in a sub-scanning direction which is generally perpendicular to the main scanning direction, which apparatus comprises:

at least two light sources that emit light beams having different wavelengths;

a light deflector that deflects the emitted light beams in the direction of main scanning; and a focal point adjusting means that adjusts the position of the focal point of the light beam emitted from at least one of the light sources.

In one preferred embodiment, the focal point adjusting means is composed of a transparent plane parallel plate that is inserted into the optical paths of the light beams and is capable of changing the angle it makes with the light beams.

In another preferred embodiment, the focal point adjusting means is a transparent elastic member that is inserted into the optical paths of the light beams and the thickness of which can be changed.

In still another preferred embodiment, the focal point adjusting means is a transparent wedge-shaped member that is inserted into the optical paths of the light beams and which is movable in a direction perpendicular to the direction in which the light beams travel.

In yet another preferred embodiment, the focal point adjusting means is composed of a transparent plane parallel plate that can be inserted into or taken out of the optical paths of the light beams.

In another preferred embodiment the focal point adjusting means is provided in a position that is the most downstream of the travel of the light beams with respect to optical devices.

In still another preferred embodiment, the plurality of light sources emitting at different wavelengths consist of a light source for emitting image reading light and a light source for emitting image recording light.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

FIG. 2 is a schematic cross section of the light beam scanning apparatus of FIG. 1 as viewed from the front;

DETAILED DESCRIPTION OF THE INVENTION

The light beam scanning apparatus as contemplated by present invention has a plurality of light sources that emit light beams having different wavelengths and it is characterized by having a focal point adjusting means that adjusts the optical path lengths of the respective light beams in such a way that their focal distances will coincide with each other. Because of this feature, the light beam scanning apparatus of the present invention offers the advantage that even when many optical devices are used in common for guiding and processing a plurality of light beams having different wavelengths, the positions of the focal points of the respective light beams can be adjusted in such a way that they are properly focused to form image on the object to be scanned or more than one object that are moving through the same sub-scanning means. As a results, even when it is applied to a radiation image information reading and reproducing system, the light beam scanning apparatus of the present invention allows one light beam scanning means to be used in common for both an image reading beam and an image recording (reproducing) beam and one sub-scanning transport means to be used in common for both a stimulable phosphor sheet and a recording sheet, thereby making it possible to reduce the size and cost of the overall system.

In preferred embodiments, the focal point adjusting means used in the present invention is composed of either a rotatable or retractable transparent plane parallel plate, or a movable transparent wedge-shaped member, or an expandable transparent elastic member, so incorporating the adjusting means will not increase either the overall size or the production cost of the scanning apparatus. Hence, this apparatus can be applied to a radiation image information reading and reproducing system without increasing its overall size or the cost of its production.

The light-beam scanning apparatus of the present invention is described below in greater detail with reference to the preferred embodiments shown in the accompanying drawings.

Figure 1:
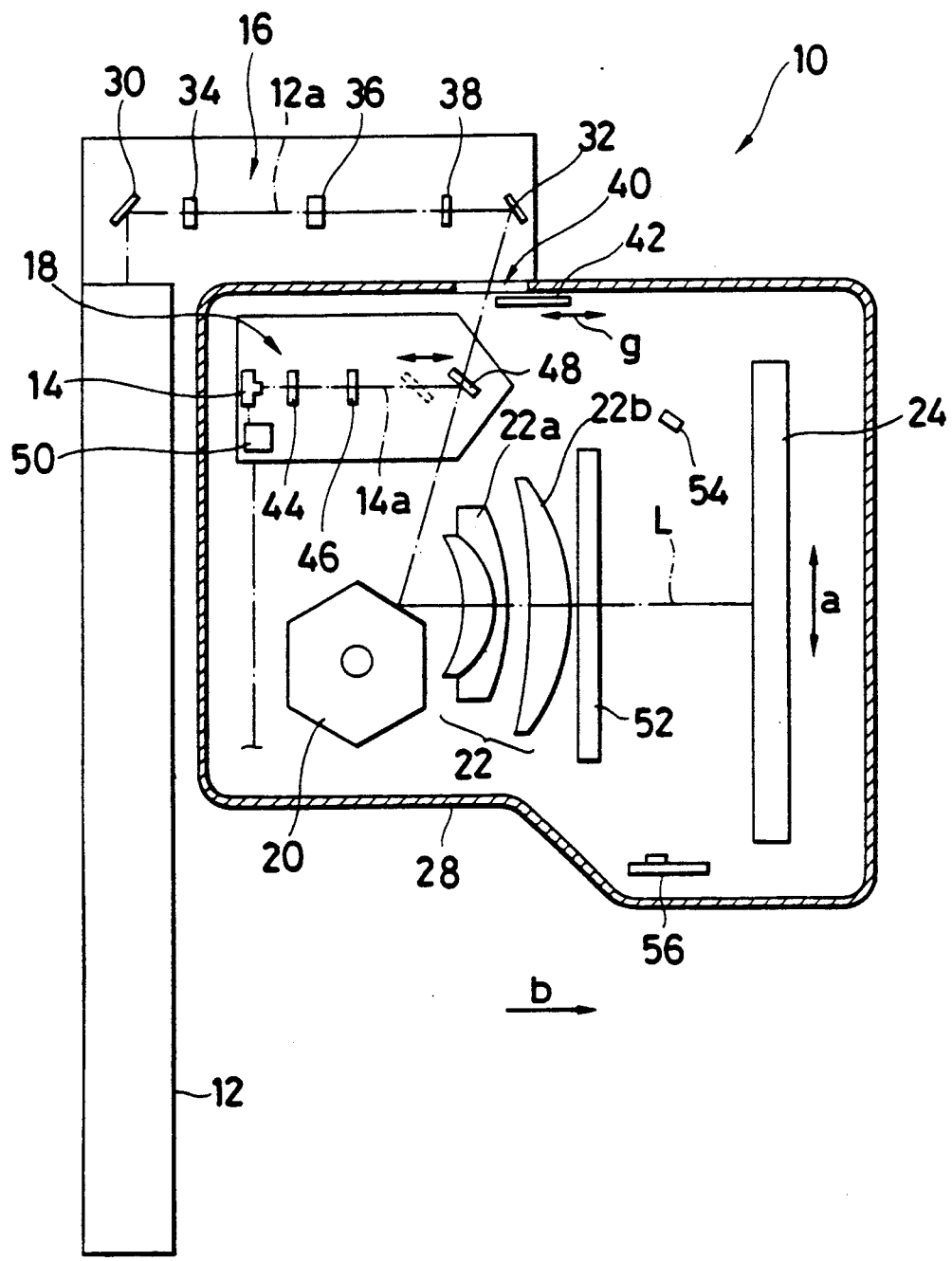
FIG. 1 is a schematic cross section of a light beam scanning apparatus according to an embodiment of the present invention as viewed from above.

FIG. 1 is a schematic cross section of an example of the light beam scanning apparatus of the present invention as viewed from above, and FIG. 2 is a schematic cross section of this light beam scanning apparatus as viewed from the front.

The light beam scanning apparatus generally indicated by 10 may be applied with particular advantage to a radiation image information reading and reproducing system and has two light sources, one being a He-Ne laser 12 that emits a reading beam 12a having a wavelength of 633 nm and the other being a semiconductor laser diode (hereinafter abbreviated as LD) that emits an image recording beam 14a having a wavelength of 780 nm.

This light beam scanning apparatus 10 further comprises an optical means 16 for forming the optical path of the reading beam 12a, an optical means 18 for forming the optical path of the recording beam 14a, a polygonal mirror 20, an fθ lens 22, a mirror 24 for bending light beams downward, and a focal point adjusting means 26 that is the most characteristic part of the present invention. The optical means 18, polygonal mirror 20, fθ lens 22 and the mirror 24 are accommodated within a housing 28, whereas the focal point adjusting means is positioned below the housing 28.

The light beam scanning apparatus 10 is so constructed that the optical path of the reading beam 12a is allowed to coincide with that of the recording beam 14a upstream of the polygonal mirror 20 in the housing 28 (the term "upstream" as used herein should be taken with reference to the direction in which each light beam travels) and, thereafter, the two light beams travel in the same optical path until they are launched into the focal point adjusting means 26 to scan an object of interest A (see FIG. 2). In other words, optical devices such as the polygonal mirror 20, fθ lens 22 and the mirror 24 are used in common for both the reading beam 12a and the recording beam 14a.

In the light beam scanning apparatus 10 described above, each of the light beams the optical paths of which have been brought into registry is reflected and deflected by the polygonal mirror 20 in the direction of main scanning (as indicated by arrow a), bent downward by the mirror 24 and adjusted for the position of its focal point by the focal point adjusting means 26 to scan two-dimensionally the object A (the stimulable phosphor sheet or recording sheet) which is being transported in the sub-scanning direction (as indicated by arrow b) which is generally perpendicular to the main scanning direction.

The optical means 16 for forming the optical path of the reading beam 12a emitted from the He-Ne laser 12 comprises basically mirrors 30 and 32, beam expanders 34 and 36, and a cylindrical lens 38. The reading beam 12a emitted from the He-Ne laser 12 is reflected by mirror 30, has its beam diameter adjusted by beam expanders 34 and 36, reflected by mirror 32 after passing through the cylindrical lens 38 which serves as a tilt correcting optical means, and is admitted into the housing 28 through an entrance gate 40 to be incident on the polygonal mirror 20.

The light source for emitting the reading beam 12a in the present invention is by no means limited to the He-Ne laser 12 which emits a light beam having a wavelength of 633 nm and various other light beam sources may be used depending upon the type of the object A to be scanned (i.e., a source of image information).

The entrance gate 40 through which the reading beam 12a is admitted into the housing 28 is provided with a shutter 42 which is slidable in the direction indicated by arrow g. The entrance gate 40 is closed with the shutter 42 in all instances except where image information is being read.

The optical means 18 for forming the optical path of the recording beam 14a is located within the housing 28 in its upper left portion in FIG. 1. This optical means 18 is composed of a collimator lens 44, a cylindrical lens 46 and a movable mirror 48. The LD 14 has connected thereto a LD drive circuit 50 that stores an image information readout and drives the LD 14 in accordance with that information.

The recording beam 14a emitted from the LD 14 is collimated with the collimator lens 44 and the resulting parallel rays of light pass through the cylindrical lens 46 serving as a tilt correcting optical means, reflected in a predetermined direction by the mirror 48 inserted into the optical path, and is thereafter incident on the polygonal mirror 20. The mirror 48 is capable of reciprocating between the position indicated by the solid line in FIG. 1 and the position indicated by the dashed line. In an image recording mode, the mirror 48 is situated in the position indicated by the solid line and forms the optical path of the recording beam 14a. In an image reading mode, the mirror 48 moves to the position indicated by the dashed line that will not obstruct the travel of the reading beam 12a.

The light source for emitting the recording beam 14a in the present invention also is not limited to the LD 14 which emits a laser beam having a wavelength of 780 nm and various other light beam sources may be used depending upon the type of the object A to be scanned (i.e., a recording sheet).

Subsequently, the reading beam 12a or recording beam 14a (the term "light beam L" will hereunder be used whenever both beams are referred to) is incident on the polygonal mirror 20 to be reflected and deflected in the direction of main scanning (as indicated by arrow a). It should also be mentioned that the polygonal mirror 20 is not the sole example of the light deflector that can be used in the present invention and other devices such as a galvanometer and a resonant scanner may also be employed.

The light beam L reflected and deflected by the polygonal mirror 20 is launched into the fθ lens 22 and adjusted in such a way that it is focused to form a beam spot of a predetermined size and shape on the object A being scanned In the example shown, the fθ lens 22 is composed of two lens elements 22a and 22b.

The light beam L passing through the fθ lens 22 passes through a cylindrical lens 52 making part of a tilt correcting optical means and is then bent downward by the mirror 24. In the example shown, the mirror 24 is a cylindrical mirror and forms another part of the tilt correcting optical means.

A mirror 54 is located downstream of the cylindrical lens 52 on a side closer to the point where main scanning is started and a sensor 56 is located on the opposite position for detecting the position in which effective scanning of the object A is started.

The light beam L bent downward by the mirror 24 is then launched into the focal point adjusting means 26 and adjusted in such a way that its focal point (focusing position) will lie on the object A being scanned.

The light beam scanning apparatus 10 of the present invention has a plurality of light sources that emit light beams having different wavelengths. In the example shown, the apparatus has the He-Ne laser 12 which emits the reading beam 12a having a wavelength of 633 nm and the LD 14 which emits the recording beam 14a having a wavelength of 780 nm.

As already mentioned, light beams having different wavelengths are refracted by different refractive indices by optical devices including cylindrical lenses, a polygonal mirror and the like and hence will be focused in different positions if the same optical means is employed. Accordingly, if, in the example shown, the individual optical devices are preadjusted in such a way that the reading beam 12a will be focused to form image on one object A, the recording beam 14a will not be properly focused on another object A to achieve satisfactory image recording.

On the other hand, the light beam scanning apparatus 10 of the present invention, having the focal point adjusting means 26, permits a plurality of light beams having different wavelengths to be properly focused on the object A by a simple mechanism.

Figure 3A:
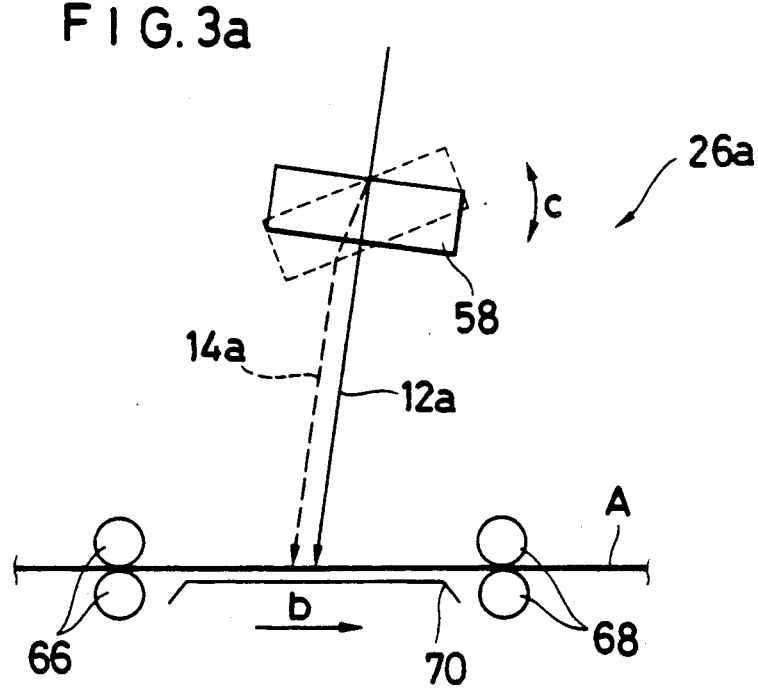
FIGS. 3a, 3b, 3c and 3d are schematic front views of various examples of the focal point adjusting means used in the light beam scanning apparatus shown in FIG. 1.

FIG. 3a shows an example of such focal point adjusting means 26. The focal point adjusting means 26a shown in FIG. 3a is composed of a transparent plane parallel plate 58 that is inserted into the optical path of the light beam L and which is capable of adjusting the angle it makes with the direction of travel of the beam. If necessary, the plane parallel plate 58 is rotated in the direction indicated by arrow c so as to adjust the angle it makes with the light beam L and its optical path length is adjusted in a manner whereby the focal length of the beam L is properly adjusted.

Referring to the mode of image reading with the apparatus shown, the plane parallel plate 58 is situated in the position indicated by the solid line in FIG. 3a and the individual optical devices are preadjusted in such a way that the reading beam 12a will be focused on the object A with the plate 58 being situated in that position. In an image recording mode, the plane parallel plate 58 is rotated to the position indicated by the dashed line in FIG. 3a so as to refract the recording beam 14a, whereby its optical path length is changed to properly adjust the position of its focal point. Hence, the plane parallel plate 58 forming the focal point adjusting means 26a in the example shown is so preset that the angle it makes with the optical paths of the respective beams will match their focal lengths. The plane parallel plate 58 that can be used in the present invention may be of any type of a transparent plate that has at least one pair of parallel planes as exemplified by a glass plate and a transparent resin plate. It should also be noted that such plates may be rotated by any known method.

Figure 3B:
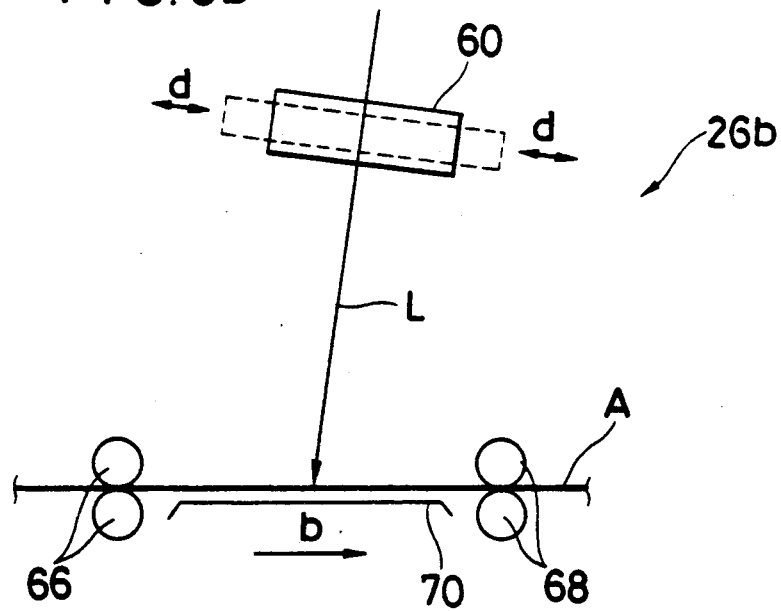

FIG. 3b shows another example of the focal point adjusting means 26 that can be used in the present invention. The focal point adjusting means 26a shown in FIG. 3a adjusts the position of the focal point of the light beam L by adjusting the angle the plane parallel plate 58 makes with that beam. In the focal point adjusting means 26b shown in FIG. 3b, a transparent elastic member 60 the thickness of which is adjustable is inserted into the optical path of the light beam L and it is expanded or contracted in the direction indicated by arrow d depending upon the type of light beam L (whether it is the reading beam 12a or the recording beam 14a) so as to adjust its thickness, whereby the position of the focal point of each beam is adjusted in such a way that it is focused on the object A. An example of the applicable transparent elastic member 60 is silicone rubber. The method of expanding or contracting the elastic member 60 also is not limited and various known methods may be applied.

Figure 3C:
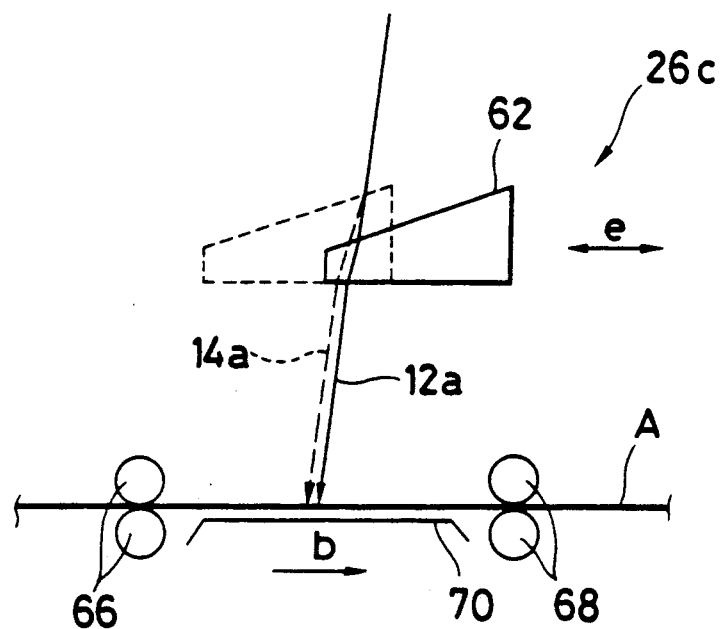

FIG. 3c shows still another example of the focal point adjusting means 26 that may be used in the present invention. The focal point adjusting means 26c shown in FIG. 3c is composed of a transparent wedge-shaped member 62 that is movable in the direction indicated by arrow e. By adjusting the position in which this wedge shaped member 62 is inserted into the optical path of the light beam L, the optical path length of the latter is so changed as to properly adjust the position of its focal point.

Referring to the mode of image reading with the apparatus shown, the wedge-shaped member 62 is situated in the position indicated by the solid line in FIG. 3c and the individual optical devices are preadjusted in such a way that the reading beam 12a will be focused on the object A with the wedge-shaped member 62 being situated in that position. In an image recording mode, the wedge-shaped member 62 is moved to the position indicated by the dashed line in FIG. 3c and the optical path length of the recording beam 14a is changed accordingly to properly adjust the position of its focal point. The wedge shaped member 62 may be formed of the same material as the aforementioned plane parallel plate 58. It can also be moved by any known methods.

Figure 3D:
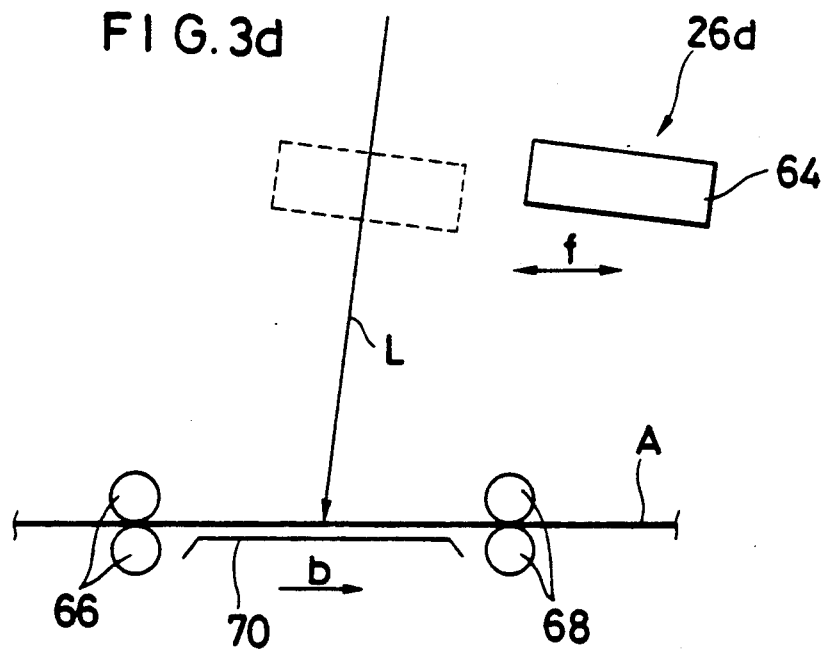

FIG. 3d shows a further example of the focal point adjusting means 26 that is applicable to the present invention. The focal point adjusting means 26d shown in FIG. 3d is composed of a transparent plane parallel plate 64 that is movable in the direction indicated by arrow f. Depending on the need, this plate is inserted into the optical path of either the reading beam 12a or the recording beam 14a so that the position of the focal point of either beam is adjusted to insure that both light beams will be properly focused on the object A.

Referring to the mode of image reading with the apparatus shown, the plane parallel plate 64 is situated in the position indicated by the solid line in FIG. 3d which is away from the optical path of the reading beam 12a and the individual optical devices are preadjusted in such a way that said beam will be properly focused on the object A with the parallel plate 64 being situated in that position. In an image recording mode, the plane parallel plate 64 is inserted into the optical path of the recording beam 14a at the position indicated by the dashed line in FIG. 3d, whereby the optical path length of that beam 14a is properly changed accordingly to adjust the position of its focal point. The plane parallel plate 64 may be formed of the same material as the aforementioned plane parallel plate 58. This plate can also be moved by any known methods.

Using the focal point adjusting means 26 described above, the light beam scanning apparatus 10 of the present invention enables light beams having different wavelengths to be focused on a plurality of objects A being transported by the same sub scanning transport means. The position of focal point (focal length) will vary not only with the curvatures of individual optical devices used (e.g. lenses and mirrors) and their refractive indices but also with the wavelength of a specific light beam. Thus, it is impossible to predetermine uniquely as to whether the focal length will increase or decrease depending upon the wavelength of a specific light beam and the position of focal point should be adjusted (i.e., the focal length is decreased or increased) by the focal point adjusting means 26 as appropriate for wavelength and the optical path of the light beam L and the optical devices used in the light beam scanning apparatus to be applied.

The light beam L thus adjusted for the position of its focal point is focused for two-dimentional scanning of the object A being transported in the sub-scanning direction cf arrow b by a sub-scanning transport means composed of two pairs of rollers 66 and 68 and a guide plate 70. In an image reading mode where a stimulable phosphor sheet is selected as the object A, the reading beam 12a is irradiated on the sheet, then stimulated emission in proportion to the radiation energy stored in the sheet is generated therefrom, condensed by an optical guide 72 and admitted into a photomultiplier tube 74 where it is converted to an electric signal which is then transferred as image information to the LD drive circuit 50. In an image recording mode where a recording sheet is selected as the object A, the LD drive circuit 50 drives LD 14 in response to the previously read image information in such a way that the recording beam 14a scans the recording sheet two dimensionally to record an image thereon.

In the light beam scanning apparatus 10 shown in FIG. 2, the focal point adjusting means 26 is located downstream of the mirror 24 but this is not necessarily in the case of the present invention and the adjusting means 26 may be located in various other positions such as upstream of the polygonal mirror 20. However, as already mentioned, the difference in the position of focal point is caused by such factors as the difference between the refractive indices of individual optical devices which in turn is due to the difference between the wavelengths of light beams used. Hence, the focal point adjusting means 26 is preferably located in the position shown in FIG. 2, namely, downstream of the optical devices that are used in common for both the reading beam 12a and the recording beam 14a.

Figure 4:
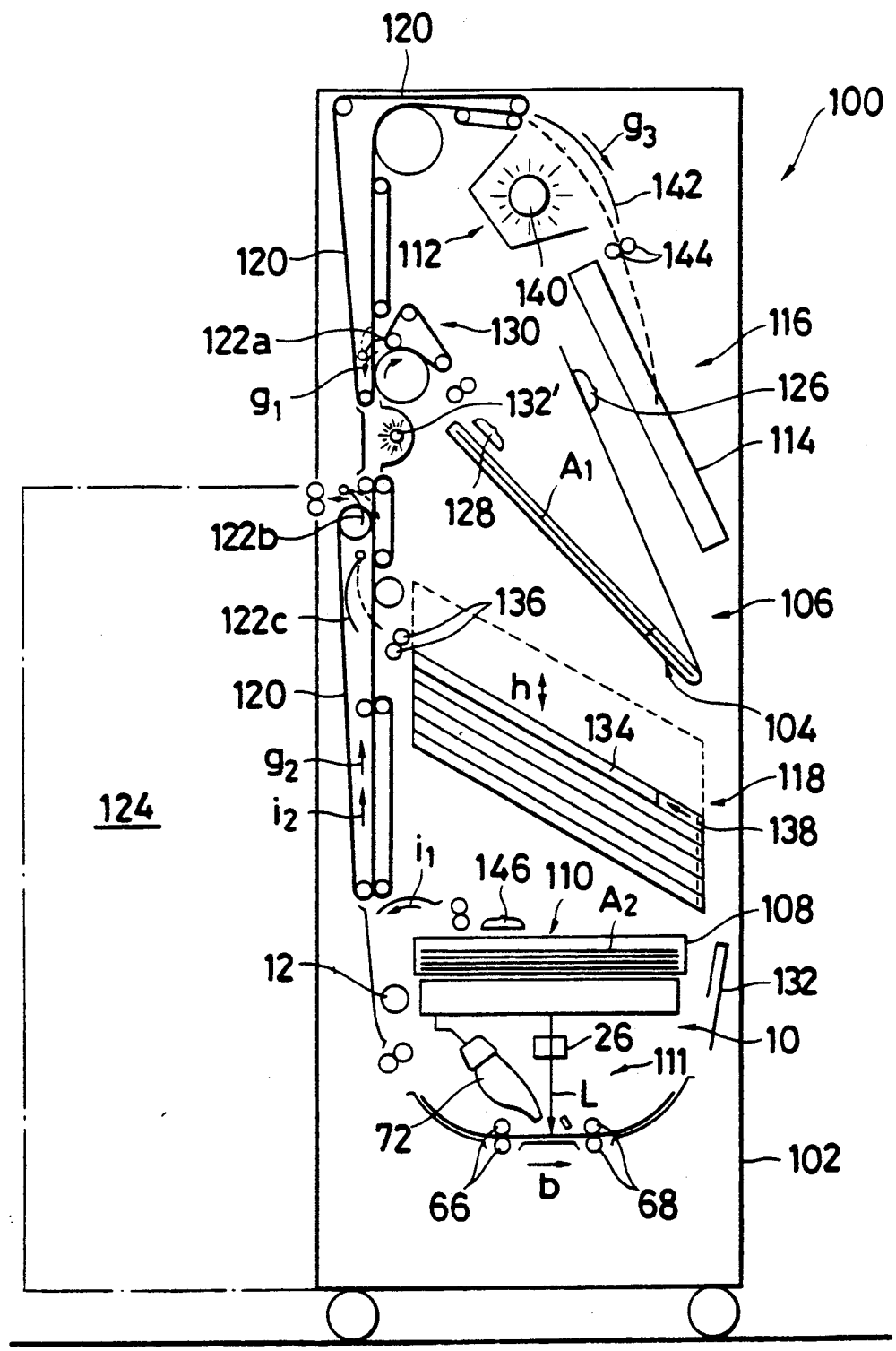
FIG. 4 is a schematic cross section of a radiation image information reading and reproducing system to which the light beam scanning apparatus shown in FIG. 1 may be applied.

FIG. 4 shows for illustrative purposes a radiation image information reading and reproducing system to which the light beam scanning apparatus 10 is applied. The system generally indicated by 100 in FIG. 4 (which is hereunder referred to as "reading and reproducing system 100") reads the radiation image information carried on a stimulable phosphor sheet A1 (hereunder referred to as "phosphor sheet") and records (reproduces) it as a visible image on a recording sheet A2. This system uses the above described light beam scanning apparatus 10 of the present invention for the purpose of reading and recording the image information. Therefore, in the example shown in FIG. 4, the object A to be scanned is either the phosphor sheet A1 or the recording sheet A2.

The reading and reproducing system 100 comprises the following components that are accommodated within a housing 102 with one component being positioned on top of another: a phosphor sheet supply unit 106 into which a cassette 104 capable of accommodating the phosphor sheet A1 can be detachably loaded; a recording sheet supply unit 110 that detachably holds a recording sheet supply magazine 108 capable of accommodating a plurality of recording sheets A2 such as silver halide photographic films; a light scanning unit 111 that adopts the light beam scanning apparatus 10 of the present invention and which reads the image information carried on the phosphor sheet A1 while recording the image information readout on the recording sheet A2; an erasing unit 112 that erases the residual radiation image information on the phosphor sheet A1 after image reading; a phosphor sheet accommodating unit 116 that holds a tray 114 detachably; and stacker 118.

A sheet transport means 120 composed basically of nip belt conveyors, roller pairs and transport rollers is provided on the lateral side (on the left side of FIG. 4) of the respective units downward of the light scanning unit 111. The greater part of the sheet transport means 120 is used in common for both the phosphor sheet A1 and the recording sheet A2. Hence, the transport means 120 is provided with flappers 122a, 122b and 122c each of which is movable to the position indicted by the solid line or to the position indicated by the dashed line so as to change the transport pat in accordance with the type of the object A to be scanned.

Outside the housing 102 is provided an automatic processing unit 124 for developing the recording sheet A2 that has passed through the image recording step.

In the system shown in FIG. 4, a cassette 104 for accommodating the phosphor sheet A1 carrying radiation image information is loaded at a predetermined position in the phosphor sheet supply unit 106. The cassette 104 consists of a body and an openable cover. When the cover is opened by a suction means 126, the phosphor sheet A1 is taken out of the cassette 104 by a suction means 128 and transported to the sheet transport means 120 by a supply means 130 that consists instance, the flapper 122a takes the position indicated by the solid line and guides the phosphor sheet A1 downward in the direction indicated by arrow $g_1$. A sub-erasing light source 132' which is provided below the flapper 122a remains off.

The phosphor sheet A1 transported to the light scanning unit 111 by the sheet transport means 120 travels through that unit in the direction indicated by arrow b (the subscanning direction) as it is scanned two-dimensionally by the light beam L (the reading beam 12a) for reading the radiation image information carried on it. In this image reading mode, the shutter 42 int he light beam scanning apparatus 10 takes the position shown in FIG. 1 and the mirror 48 is located in the position indicated by the dashed line; the He-Ne laser 12 is driven to emit the reading beam 12a which is incident on the polygonal mirror 20. The image information readout is stored in the LD drive circuit 50.

When the advancing end of the phosphor sheet A1 contacts a guide plate 13 after the reading of the image formation on the sheet has been completed, the sheet transport means 120 operates in reverse direction to transport the phosphor sheet A1 in the direction opposite the direction indicated by arrow b.

Since it takes a fairly long time to complete the reading of image information, the operational efficiency will be low if the next cassette 104 is loaded in the phosphor sheet supply unit 106 only after the completion of image reading form the preceding sheet A1. To deal with this problem, the reading and reproducing system 100 shown in FIG. 4 has the stacker 118 built in so that a plurality of phosphor sheets A1 from which no image information has been read are allowed to stand by. The stacker 118 has a plurality of partitioned compartments 134 and is adapted to be movable vertically in the direction indicated by arrow h. When accommodating a phosphor sheet A1 in a certain compartment 134, the stacker 118 is moved either up or down to bring that compartment 134 adjacent to a roller pair 136, with the flapper 122c being moved to the position indicated by the dashed line, and the phosphor sheet A1 is taken out of the phosphor sheet supply unit 106 in the same manner as described above. The phosphor sheet A1 transported into the compartment 134 slides down under its own weight until it contacts a stopper 138, whereupon it comes to a rest.

When taking the phosphor sheet A1 out of the stacker 118, the latter is moved either up or down to bring the compartment 134 containing that phosphor sheet A1 to the position adjacent the roller pair 136, with the flapper 122c being moved to the position indicated by the dashed line Subsequently, the phosphor sheet A1 is pushed out by the action of the stopper 138 and sent to the sheet transport means 120 by the roller pair 136. In the sheet transport means 120, the phosphor sheet A1 is first sent upward and when the entire part of it is ejected from the stacker 118, the sheet transport means 120 operates in reverse direction and the flapper 122c is moved to the position indicated by the solid line so that the phosphor sheet A1 is transported downward (in the direction indicated by arrow $g_1$) towards the light scanning unit 111.

After completion of image reading, the phosphor sheet A1 is transported upward (in the direction indicated by arrow $g_2$) by the sheet transport means 120 and thereafter sent to the erasing unit 112. In the erasing unit 112, the phosphor sheet A1, as it is guided by a guide plate 142, is transported by the sheet transport means 120 and a roller pair 144 in the direction indicated by arrow $g_3$ and illuminated with erasing light from a light source 140 to erase the residual radiation image information.

If the phosphor sheet A1 is such that it has been taken out of the cassette 104, the roller pair 144 and the sheet transport means 120 start to run in reverse direction after completion of the erasing step and before the sheet is transported into the tray 114, whereby the phosphor sheet A1 from which the residual radiation image information has been erased is brought into the stacker 118. Thus, the phosphor sheet A1 from which the residual image information has been erased is temporarily accommodated in the stacker 118 so that immediately after a phosphor sheet A1 from which no image has been read is taken out of the cassette 104, the first-mentioned phosphor sheet A1 that has passed through the erasing step can be accommodated in the vacant cassette 104 for subsequent use in radiography.

When the phosphor sheet A1 which has passed through the erasing step is to be transported from the stacker 118 into the cassette 104, the flapper 122c is moved to the position indicated by the dashed line whereas each of the flappers 122a and 122b is moved to the position indicated by the solid line, and the rear end of the sheet may be pushed forward by the stopper 138 in the same manner as described above in connection with the ejection of the sheet out of the stacker 118. Then, the sheet transport means 120 sends the phosphor sheet A1 upward and, as it is guided by the flapper 122a, the sheet is brought into the cassette 104 by the supply means 130. It should be mentioned here that the phosphor sheet A1, if it is left in the stacker 118 for a prolonged period, may sometimes have unwanted radiation buildup which can cause a noise problem, so when the phosphor sheet A1 which has passed through the erasing step is to be transported from the stacker 118 into the cassette 104, the sub-erasing light source 132' is turned on to insure complete erasure of the residual radiation from the sheet. Needless to say, the system shown in FIG. 4 may be adapted in such a way that the phosphor sheet that has passed through the erasing step at the erasing unit 112 is immediately accommodated in the cassette 104.

The image information readout may be recorded on recording sheets A2 by the following procedure. In the recording sheet supply unit 110, one recording sheet A2 is taken out of the supply magazine 108 by suction means 146 and fed in the direction of arrow $i_1$ towards the transport means 20 which, in turn, transports the recording sheet A2 downward as in the case of the transport of the phosphor sheet A1, whereby the sheet A2 is fed to the light scanning unit 111.

The recording sheet A2, as it travels through the light scanning unit 111 in the direction of arrow b (the sub-scanning direction), is scanned two-dimensionally with the recording beam 14a so as to record the image information readout on the sheet In this image recording mode, the shutter 42 in the light-beam scanning unit 10 takes a position that closes the entrance gate 40 and the mirror 48 is located in the position indicated by the solid line in FIG. 1; the LD drive circuit 50 drives the LD 14 in accordance with the previously stored image information, whereupon the LD 14 emits the recording beam 14a to be incident on the polygonal mirror 20.

When the advancing end of the recording sheet A2 on which the image information is being recorded contacts the guide plate 132 as in the case of information reading from the reading sheet A1, the sheet transport means 120 operates in reverse direction to transport the recording sheet A2 in the direction opposite the direction indicated by arrow b.

The recording sheet A2 which has passed through the recording step is driven further upward (in the direction of arrow $i_2$) by the sheet transport means 120. In this case, the flapper 122b takes the position indicated by the dashed line in FIG. 4, namely, it is inserted into the sheet transport path, whereupon the recording sheet A2 is transported into the automatic processing unit 124 for development.

While the light beam scanning apparatus of the present invention has been described above in detail with reference to the case where it is applied to a radiation image information reading and reproducing system, it should be noted that this is not necessarily the case of the present invention and it may be applied to various other uses such as where it is applied to an image recording system that permits recording beams of different wavelengths to be emitted and that enables image to be recorded on plural kinds of recording sheet having sensitivity to light at the different wavelengths. Needless to say, various other improvements and modifications can be made without departing from the spirit and scope of the present invention.

As described in detail on the foregoing pages, the light beam scanning apparatus of the present invention has a plurality of light sources that emit light beams having different wavelengths and it is characterized by having a focal point adjusting means that adjusts the positions of focal points of the respective light beams. Because of this feature, the light beam scanning apparatus of the present invention offers the advantage that even when many optical devices are used in common for guiding and processing a plurality of light beams having different wavelengths, the positions of the focal points of the respective light beams can be adjusted in such a way that they are properly focused to form image on the object or more than one object to be scanned that are moving through the same sub-scanning means. As a result, even when it is applied to a radiation image information reading and reproducing system, the light beam scanning apparatus of the present invention allows one light beam scanning means to be used in common for both an image reading beam and an image recording (reproducing) beam and one sub-scanning transport means to be used in common for both an image bearing medium and recording medium, thereby making it possible to reduce the size and cost of the overall system.

What is claimed is:

1. A light beam scanning apparatus which deflects light beams in a main scanning direction and which two-dimensionally scans an object of interest moving in a sub-scanning direction which is generally perpendicular to said main scanning direction, comprising:
   at least two light sources which emit light beams of respectively different wavelengths;
   a light deflector that deflects said light beams in the direction of main scanning; and
   focal point adjusting means that separately adjusts the position of the focal point of each of said light beams in accordance with the wavelength of each of said light beams.

2. A light beam scanning apparatus according to claim 1 wherein said focal point adjusting means is composed of a transparent plane parallel plate inserted into the optical path of each of said light beams and is capable of changing the angle it makes with a given light beam in accordance with the wavelength of the given light beam.

3. A light beam scanning apparatus according to claim 1 wherein said focal point adjusting means is a transparent elastic member inserted into the optical path of each of said light beams and the thickness of the transparent elastic member is changed in accordance with the wavelength of each of said light beams.

4. A light beam scanning apparatus according to claim 1 wherein said focal point adjusting means is a transparent wedge-shaped member inserted into the optical path of each of said light beams and which is movable in a direction perpendicular to the direction in which said light beams travel such that a thicker or thinner portion of the wedge-shaped member is inserted into the optical path in accordance with the wavelength of each of said light beams travelling along said optical path.

5. A light beam scanning apparatus according to claim 1 wherein said apparatus includes a plurality of optical devices and said focal point adjusting means is provided in a position that is the most downstream of the travel of the light beams with respect to said optical devices.

6. A light beam scanning apparatus according to claim 1 wherein said or respectively least two light sources emitting said light beams at different wavelengths comprises a light source for emitting image reading light and a light source for emitting image recording light.

7. A light beam scanning apparatus which deflects light beams in a main scanning direction and which two-dimensionally scans an object of interest moving in a sub-scanning direction which is generally perpendicular to said main scanning direction, comprising:
   at least two light sources which emit light beams of respectively different wavelengths;
   a light deflector that deflects said light beams in the direction of main scanning; and
   focal point adjusting means that adjusts the position of the focal point of at least one of said light beams comprising a transparent plane parallel plate that can either be inserted into or taken out of the optical paths of said light beams in accordance with the wavelength of each of said light beams.

* * * * *